Patented June 5, 1923.

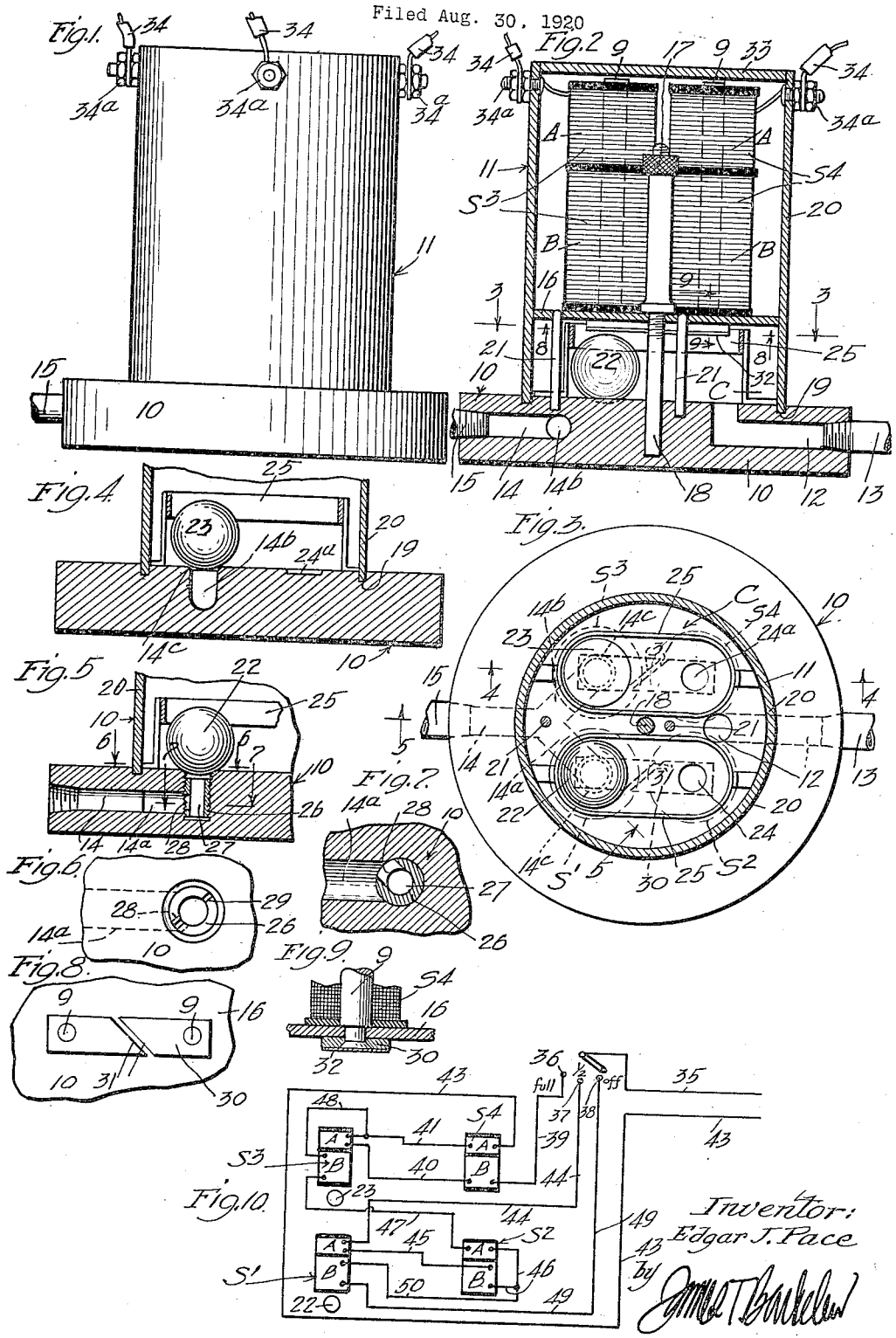

1,457,599

UNITED STATES PATENT OFFICE.

EDGAR J. PACE, OF LOS ANGELES, CALIFORNIA, ASSIGNOR TO EL ROY L. PAYNE, OF LOS ANGELES, CALIFORNIA.

VALVE.

Application filed August 30, 1920. Serial No. 406,988.

*To all whom it may concern:*

Be it known that I, EDGAR J. PACE, a citizen of the United States, residing at Los Angeles, in the county of Los Angeles, State of California, have invented certain new and useful Improvements in Valves, of which the following is a specification.

This invention relates generally to valves, but more particularly to electrically operated valves. The general object of the present invention is to provide an electrically operated valve which will be simple in construction, effective, and which will not easily become inoperative. It is also an object of the present invention to provide a valve which may be turned to any predetermined partially open position, in addition to being turned to its open or closed positions.

The invention and details of construction of a preferred form of valve embodiment of the invention will be best understood from the following detailed description of a specified preferred form of mechanism, reference for this purpose being had to the accompanying drawings, in which—

Fig. 1 is a side elevation of the valve; Fig. 2 is a vertical longitudinal section of the valve; Fig. 3 is a horizontal sectional view taken as indicated by line 3—3 on Fig. 2; Fig. 4 is a sectional view taken as indicated by line 4—4 on Fig. 3; Fig. 5 is a sectional view taken as indicated by line 5—5 on Fig. 3; Fig. 6 is a plan view taken as indicated by line 6—6 on Fig. 5; Fig. 7 is an enlarged sectional view taken as indicated by line 7—7 on Fig. 5; Fig. 8 is a detailed view taken as indicated by line 8—8 on Fig. 2; Fig. 9 is an enlarged sectional view taken as indicated by line 9—9 on Fig. 2; Fig. 10 is a diagram showing the wiring arrangement for the various circuits.

Throughout the drawings numeral 10 designates the base of the valve, while numeral 11 designates the cylindrical casing of the valve. The base 10 is provided with an inlet port 12 which is fed by suitable inlet pipe 13. Base 10 is also provided with a suitable outlet port 14 which connects to suitable outlet pipe 15. The valve may be mounted on pipes 13 and 15 or it may be mounted on any suitable support.

The fluid which is to be controlled by the valve, is allowed to pass from inlet port 12 into a chamber C formed between a partition plate 16 set rigidly in the cylindrical casing 11, and the base 10. This chamber is formed air-tight, the casing 11 and the partition 16 being held down by a long-clamping nut 17 which is screw-threadedly engaged to bolt 18 which is held secured to the base 10. This clamping means also permits the casing to be removed from the base when desired. To furnish a more effective seal for this airtight chamber C it is preferred a circular groove or depression 19 be provided in the base to receive the lower end of the cylindrical casing 11. Guide posts 21 extending upwardly from and secured to base 10 and projecting into plate 16. These posts 21 are preferably arranged unsymmetrically so the upper member can only be placed in one position relatively to the base. It may be here stated that the bores in wall 16 are only sufficiently large enough to allow the passage of bolt 18 and posts 21, so as to make the chamber as nearly air tight as possible.

The outlet port 14 is provided with branch outlets $14^a$ and $14^b$ which provide two outlets from the chamber C. In order to open and close these outlets, comparatively heavy balls 22 and 23 are arranged to seat tightly upon the valve seats $14^c$ formed in the base 10 at the upper end of outlets $14^a$ and $14^b$. These balls furnish leak-proof valves which prevent the escape of the fluid from chamber C. As will be seen in Figs. 2 and 3, the inlet port is arranged on the opposite side of the base from that of the outlet ports, and thus there is no tendency for the inflowing fluid to raise the valve balls off their seats, and the pressure of the fluid will tend to press the balls more tightly onto their seats.

Balls 22 and 23 are so arranged as to roll horizontally upon the upper surface of base 10 and sufficiently far to allow the outlet ports to entirely open when it is desired. To prevent the balls from accidentally rolling back to their closed positions, suitable depressions 24 and $24^a$ are provided in base 10. Upon base 10 are mounted ball guides 25 which are clearly shown in Figs. 3 and 4 of the drawings. These guides direct the balls between their respective seats.

It is preferred that one of the outlet ports be provided with an adjusting means and I have shown such means on outlet port $14^a$. This adjusting means is obtained by providing the vertical portion of port $14^a$ with a plug 26 which is screw threadedly engaged to the base 10. This plug is provided with a vertical bore 27, and is also provided with a communicating horizontal bore 28. Bore 28 is arranged to register with the horizontal portion of port 14$^a$. It will be noted, however, that only a single bore 28 is provided at one side of the plug 26. The bores 27 and 28 are preferably all slightly smaller in diameter than the diameter of the port 14$^a$. Plug 26 is arranged with suitable screw driver slots 29 so the plug may be easily turned to any desired position. Referring to Fig. 7 it will be readily seen that, for instance, plug 26 is turned approximately one quarter of a revolution and by so doing the bore 28 is set so only about one-half of its opening is an engagement with bore 14$^a$. It may be here stated that the plug may be turned to any partly open position, but I have shown same as being set at its one half position.

To operate the balls 22 and 23 suitable electromagnets are arranged directly above the various positions of the balls. An electromagnet is arranged above each ball in its closed position and another electromagnet arranged above that ball when in its open position. The electromagnets S$^1$ and S$^2$ are illustrated as operating the ball 22 and electromagnets S$^3$ and S$^4$ operating ball 23. Each of these electromagnets is mounted upon and extends upwardly from partition 16 of upper member 11, as will be clearly seen in Fig. 9 of the drawings. Due to the electromagnets being spaced a comparatively far distance apart, the electromagnets would necessarily have to possess strong magnetic power in order to attract the balls from one position to another. In order to lessen the magnetic power necessary to move the balls, rectangular shaped pole pieces 30 are arranged under partition 16 and are held in position by riveting the lower end of an electromagnet, core 9 through pole piece 30 and through the partition 16. Pole pieces 30 have at their adjacent ends diagonal faces 31, as clearly shown in Fig. 8 of the drawings. They are preferably made of soft iron or any other magnetic materials. By providing the pole pieces 30 with diagonal faces 31 the magnetic power is distributed over the entire width of path of the travel of the balls and is distributed over a much larger area than if only the ordinary solenoid core were used to attract the balls. The diagonal faces 31 are arranged near together so only a comparatively small space is left between these faces, and this provides means for gradually changing the magnetic attraction on the balls and it will be readily seen that the balls are continuously in control of the electromagnets. To prevent the balls from becoming magnetized or to prevent them sticking to the pole pieces, a non-magnetic plate 32 is arranged so as to cover the members 30. This plate is preferably made of copper, brass or the like. The cylindrical casing is preferably provided with a metal cover 33. Suitable lead wires 34 from the four magnets connect to suitable binding posts 34$^a$ which are secured to the case 11. The windings of the electromagnets are divided into two parts, each comprising a small coil A and a large coil B.

The operation of changing the positions of the balls will now be described. Assuming the balls are in the "closed" position, that is, the balls are on the ports 14$^a$ and 14$^b$, and it is desired to move the balls to the full "open" position, it will be seen that the balls 22 and 23 must both be moved horizontally and placed in the depressions 24 and 24$^a$, respectively. This operation leaves both ports fully open. If it is desired to move the balls from the full "open" position to the "half" or partly open position it will be apparent that only the ball 23 need be then changed to its "closed" position, which operation leaves the "half" port 14$^a$ open. If for instance, the balls are each in the "closed" position, and it is desired to change the valve to its "half" position, it is necessary to move the ball 22 from the port 14$^a$ to its "open" position, leaving the ball 23 in its "closed" position. This feature is important in that the valve may be changed from the "closed" position to the "open" position, or vice versa, without first passing through the "half" position which is common among valves of this nature which are provided today.

These operations are controlled by means of a control switch S, which may be an ordinary three point switch. The various circuits will be best understood from the following description, and referring particularly to Fig. 10 of the drawings, it will be seen how the various coils are energized. Assuming the balls are in the "closed" position, as shown throughout the various views of the drawings, and that it is desired to move the balls to the "open" position, it will be seen that the current follows wire 35 from the source of current through the "open" contact 36 of the control switch S, following wire 39 through larger coil B of electromagnet S$^4$, from here the current follows wire 40 through the smaller coil A of electromagnet S$^3$ and then follows wire 41 through small coil A of magnet S$^4$ and then follows wire 43 which returns to the source of current. In this operation the smaller coil A of electromagnet S$^3$ slightly lifts the ball 23 from off its seat and the ball is then drawn horizontally by the larger coil B and the smaller coil A of electromagnet S$^4$, whereupon, when the current is interrupted, the ball will drop into depression 24$^a$ and the valve will be "open." The movement of the ball, in this particular case is similar for the various positions, and for this reason the movement shall not hereinafter be described in detail in all cases.

When it is desired to change the valve to its "half" or partly open position, from the standard or "closed" position, the current passes from wire 35 through "half" contact 37 of control switch S, follows wire 44 through smaller coil A of electromagnet S¹, then follows wire 45 through larger coil B of electromagnet S², follows wire 46 into the smaller coil A of the electromagnet S² from which it follows wire 47 into larger coil B of electromagnet S³, then through wire 48 which connects to wire 41 and passes through smaller coil A of electromagnet S⁴, from which the current follows the wire 43 to the source of current. By this energization it will be seen that ball 23 will be moved back to its "closed" position if it happens to be open; if it is closed it will remain closed. This is so because the energy of a small coil (in this case coil A of magnet S⁴) is not sufficient to draw a ball horizontally when it is held by a large coil (in this case coil B of magnet S³) although it is sufficient to lift the ball off its seat. If ball 22 is in its "closed" position it will of course be moved to "open" position when the magnets are energizing as just stated; but if ball 22 is in "open" position it will be left there. Thus, whenever the switch is thrown to contact 37 the valve will be moved to "half" or partly open position regardless of whatever position it was in before.

When it is desired to change the valve to its "closed" position from either the "open" or "half" position, the current passes from wire 35 through "closed" contact 38 of control switch S, follows wire 49 through larger coil B of electromagnet S¹, from which it follows wire 50 which connects to wire 46 and then passes through smaller coil A of electromagnet S², then follows wire 47 through larger coil B of electromagnet S³ and then follows wires 48 and 41 through smaller coil A of electromagnet S⁴ and then follows wire 43 back to the source of supply. This operation causes balls 22 and 23 to be placed over the ports 14ᵃ and 14ᵇ, respectively, which closes the valve.

It may be here stated that if it is desired to pass acids or strong fluids through the valve, the balls and the interior of the chamber C may be heavily plated to prevent corrosion which would readily destroy the interior parts of the valve. Another important feature of the embodiment of the present invention is the provision of the leak-proof chamber and the leak-proof housing for the electromagnets, which prevents the gases or the like from coming into contact with these magnets. Another important feature is that the current is not broken within the valve mechanism which might cause sparking that would result in igniting the gases.

Having described a specific preferred form of embodiment of the present invention, I do not wish to limit myself to the particular details of construction, but wish to reserve to myself any changes, modifications or variations that may appear to those skilled in the art or that may fall within the scope of the following claims.

Having described a preferred form of my invention, I claim:

1. In a valve a base, a chamber above the base, a port leading up through the base into the chamber and a valve seat around the port, a ball adapted to rest on said seat, a depression in the base removed from the seat, electro-magnetic means to lift the ball, and electro-magnetic means to move the ball between the seat and depression, said electro-magnetic means embodying two magnets situated above the seat and depression respectively, each magnet having a small and a large winding, and means to energize either winding of each of said magnets.

2. In a valve a base, a chamber above the base, a port leading up through the base into the chamber and a valve seat around the port, a ball adapted to rest on said seat, a depression in the base removed from the seat, electro-magnetic means to lift the ball, and electro-magnetic means to move the ball between the seat and depression, said electro-magnetic means embodying two magnets situated above the seat and depression respectively, each magnet having a small and a large winding, and means to energize the small winding of one magnet and the large winding of the other, or to energize the large winding of the first mentioned and the small winding of the second mentioned magnet.

3. In a valve a base, a chamber above the base, a port leading up through the base into the chamber and a valve seat around the port, a ball adapted to rest on said seat, a depression in the base removed from the seat, electro-magnetic means to lift the ball, and electro-magnetic means to move the ball between the seat and depression, said electro-magnetic means embodying two magnets situated above the seat and depression respectively, each magnet having a small and a large winding, and means to energize either winding of each of said magnets; and a guide for the ball to direct it between the seat and depression.

4. In a valve, a base, a port leading to the upper face of the base and a valve seat around the port, a port closure member adapted to rest on the seat, electro-magnetic means to lift said member, and electro-magnetic means to move the member laterally away from the port, said electro-magnetic means embodying two laterally spaced magnets, each magnet having a small and a large winding, and means to energize either winding of each of the magnets.

5. Two such mechanisms as specified in claim 4, further characterized by the magnet energizing means being arranged for one mechanism to energize selectively either the small coil of one magnet and the large coil of the other magnet, or vice versa; and selectively to energize the coils of the magnets of the other mechanism either correspondingly to the energization in the first mentioned mechanism or oppositely thereto.

In witness that I claim the foregoing I have hereunto subscribed my name this 16th day of August, 1920.

EDGAR J. PACE.

Witness:
VIRGINIA I. BERINGER.